United States Patent [19]

Yuan

[11] Patent Number: 5,777,403
[45] Date of Patent: Jul. 7, 1998

[54] VOICE COIL MOTOR WITH AIR GUIDE AND AIR BELLOWS

[75] Inventor: Bausan Yuan, San Jose, Calif.

[73] Assignee: Nikon Corporation, Tokyo, Japan

[21] Appl. No.: 692,904

[22] Filed: Jul. 30, 1996

[51] Int. Cl.[6] .................................................. H02K 41/02
[52] U.S. Cl. ........................ 310/12; 310/13; 310/14; 384/100; 384/107
[58] Field of Search ......................... 384/100, 107, 384/113; 310/12, 13, 14, 15; 360/126, 31, 73.03, 103

[56] References Cited

U.S. PATENT DOCUMENTS

| Re. 32,285 | 11/1986 | Farmer et al. | 360/106 |
|---|---|---|---|
| 2,929,671 | 3/1960 | Taylor | 384/113 |
| 3,656,015 | 4/1972 | Gillum | 310/13 |
| 5,590,003 | 12/1996 | Dunfield et al. | 360/98.07 |

OTHER PUBLICATIONS

Llinear Motor with Air Slide, NASA Tech Brief, vol. 17, No. 4, Apr. 1993, at p. 73.

*Primary Examiner*—Thomas M. Dougherty
*Assistant Examiner*—Timothy A. Williams
*Attorney, Agent, or Firm*—Skjerven Morrill MacPherson Franklin & Friel; Thomas S. MacDonald

[57] ABSTRACT

A voice coil motor has a flux return housing with at least one magnet and a soft iron cantilevered core. A coil holder, including an electrical coil spaced from magnet, is telescoped over the core with an air gap between the sides of the coil holder and the sides of core. The coil holder has an open end and a closed end forming with the distal end of the core a pressurized air bellows, which can vertically support a payload such as a Z-axis motion stage. The coil holder is telescopically movable with respect to the core along the air gap supplied with pressurized air through longitudinal air ducts in the core and through transverse orifices extending from the ducts to the air gap. A regulator is connected to a core central bore for adjusting pressure in a bellows chamber between the coil holder closed end and the distal end of the core for supporting the payload.

12 Claims, 3 Drawing Sheets

VOICE COIL MOTOR WITH AIR GUIDE AND AIR BELLOWS

BACKGROUND OF THE INVENTION

1. Field of the Invention

The present invention relates to electric motors of the linear motion type. More particularly, it relates to a miniaturized voice coil motor with built-in air guide and air bellows to provide efficient, noncontact motion to the moving member and a payload.

2. Background of the Invention

A voice coil motor (VCM) is a widely used direct drive, limited motion device. It utilizes the interaction of a permanent magnet field and a coil winding to produce a force proportional to the current applied to the coil. This force moves the coil member relative to the magnet assembly and is typically used for shifting a moving object (payload) rapidly back and forth between precisely located positions or for aligning the payload. Because the VCM provides a linear motion, the payload must be constrained in the other directions to ensure the stable motion of the object. This is typically achieved by guiding the moving object via roller or air bearings that constrain the payload in the two directions orthogonal to the direction of the linear motion provided by the VCM. U.S. Pat. Re. 32,285 illustrates the use of a voice coil motor in a actuator for a memory storage device. Read-write heads on a carriage are linearly moved relative to rotating discs of a disc drive and the moving carriage includes roller bearings which roll on a set of fixed rails. U.S. Pat. No. 3,223,780 (Gillum) also shows an external guide for the payload with components 18 and 31 of the patent shown in FIG. 1 hereof.

FIG. 1 shows a simple prior art linear VCM 10 that comprises a tubular coil 11 of wire situated within a radially oriented magnetic field. The field is produced by permanent magnets 12 embedded on the inside diameter of a ferromagnetic cylinder 14, arranged so that the magnets "facing" the coil are all of the same polarity. An inner core 15 of ferromagnetic material set along the axial centerline 17 of the coil, joined at one end to the permanent magnet assembly 12, 14, is used to complete the magnetic circuit. When current flows through the coil, an electromagnetic force is generated axially upon the coil. This force produces relative motion between the field of the magnet assembly and the coil, provided the force is large enough to overcome friction, inertia, and any other forces from loads attached to a coil holder 16.

In some applications, the use of bearings to guide the moving object is not feasible because there is limited physical space for them or they would interfere with the operation of other components of the system. One solution to this problem is to design a VCM with a built-in guide. A recent publication discloses a linear motor with an air slide disposed between the coil member and the magnet assembly. Linear Motor with Air Slide, NASA TECH BRIEFS, Vol. 17, No. 4, April 1993, at page 73.

Another concern arises where the VCM moves the payload in a vertical direction. Because the VCM must sustain the weight of the object, a steady flow of current in the coil is required. This required current can be substantial for a non-trivial payload and can require the coil and magnet assemblies to be very large, which may be impractical or not feasible. It will also generate a high level of heat in the vicinity of the coil and cause undesirable thermal effects. A similar problem exists for the situation where the VCM moves a payload that has a counter-force such as a spring reaction force. This counter-force is analogous to the gravitational force in the vertical movement scenario. Both require a steady flow of electric current to balance the payload. Thus a need exists to alleviate these concerns.

BRIEF SUMMARY OF THE INVENTION

This invention discloses a VCM device that incorporates an air bellows where a first pressurized air supply provides compressed air which is fed to the interior of a coil holder with an enclosed end, to support the payload. The air pressure sustains the weight of or balances the counter-force on the moving object mounted on the coil holder and the current in the coil causes the required small movements of the VCM.

The miniaturized VCM device utilizes compressed air from a second pressurized air supply to provide an essentially frictionless built-in air guide for the VCM payload and a built-in air bellows to pressurize and support or balance the payload when necessary. The magnet assembly includes a ferromagnetic cylindrical or rectangular shell and a ferromagnetic cylindrical or rectangular core that serves as a track for motion between the coil holder assembly and the magnet assembly. An air gap between the shell and the core leaves room for the coil assembly comprising the coil and coil holder. The coil assembly rides along the center core track on a film of pressurized air therebetween, as electric current passes through the coil. A set of air ducts supply compressed air from the second pressurized air supply to the air gap that serves as the air guide for the coil assembly. The coil holder is enclosed at the end that connects to the payload such that compressed air from the first pressurized air supply fed in through the center core forms an air bellows at the end of the core that is enveloped or telescoped by the enclosed end of the coil holder. A separate air duct through the center core supplies compressed air to the air bellows. The air from these input air ducts exits via vents through the center core. The vents are situated to eliminate interference between the air pressure in the air bellows and that in the air guide. The air guide provides smooth guided motion for the payload and the air bellows supports and balances the payload while the electromagnetic force provided by the coil and magnets provides the desired movement, including minor movement to the payload.

A feature of the invention is the creation of a voice coil drive guide inside the device which results in a smaller-in-volume drive without outside rails and rollers which extend from the ferromagnetic flux return structure and the voice coil holder, respectively.

The set of air ducts in the iron core include radial orifices of different diameters resulting in a desired pressure distribution. An additional vent is also provided in the distal and of the iron core to give a symmetrical distribution of the pressurized air radially against the inner surface of the top wall of the air bellows so that there is an essentially equal supporting force generated at the distal end of the iron core.

In a vertical orientation of the VCM of this invention where, for example, a z-axis motion stage or other structure moves vertically with the coil holder and its coil, the pressurized air exiting the air duct or bore in the iron core provides a counterbalance pressure to balance out the weight of the overlying stage or other structure. As a result the motor need not be energized to give a higher force to counter the stage weight. The moving bellows gives counterbalance to that weight, dispensing with the need for extra motor force and the need of rejecting increased heat resulting from the additional driving force. Adjusting the air pressure from the iron core is accomplished by an adjustable orifice on the core longitudinal axis facing the closed end of the bellows or by a regulator controlling the air pressure to the chamber between the distal ends of the iron core and the coil holder. This results in the up and down movement of the coil holder without the need of overcoming the weight of the stage or other structures by increased motor force.

The voice coil motor of the invention has a magnet assembly including a housing providing a flux return path and a soft iron ferromagnetic core and a pair of magnets attached to said housing and spaced from the core; and a movable coil assembly including a coil holder for supporting a payload and a tubular electrical wire coil on a surface of the coil holder, the coil assembly being telescoped with respect to the magnet assembly with a working air gap therebetween and with the coil spaced from said magnets. The coil holder has an open end slidable longitudinally with respect to the ferromagnetic core to form an air guide gap and a closed end forming an air bellows. The ferromagnetic core includes a pressurized air inlet duct and peripheral air orifices connected to the duct and extending to the air guide gap such that pressurized air is introduced into air guide gap to provide a cushion of pressurized air to support said coil holder. An adjustable restrictor is provided on the outer end of the iron core or a regulator is provided which controls the pressure in the volume or cavity between the outer end of the iron core and the closed end of the core holder forming the air bellows.

DETAILED DESCRIPTION OF THE INVENTION

Figure 1:
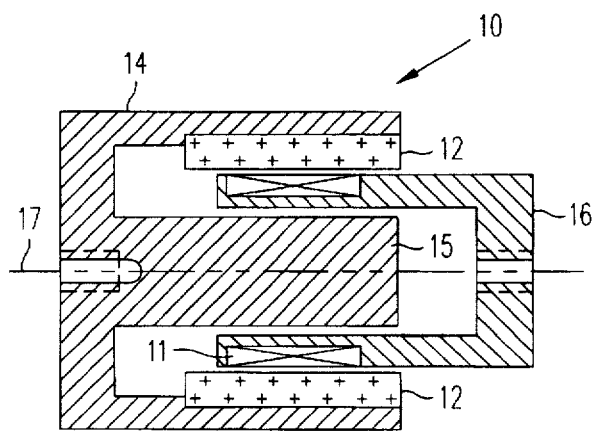
FIG. 1 is a cross-sectional schematic side view of a prior art VCM device.
Figure 2:
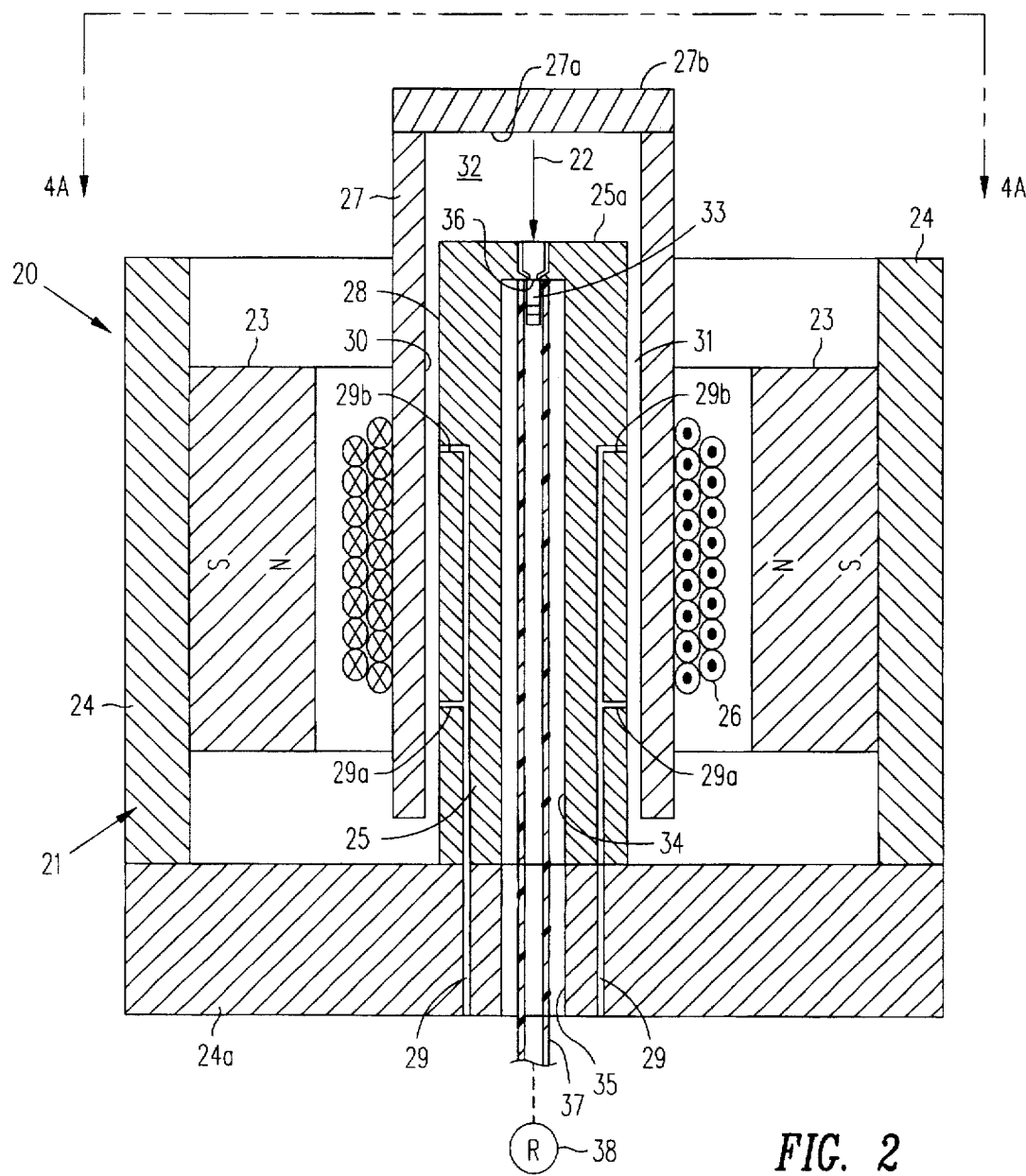
FIG. 2 is a cross-sectional schematic side view of a preferred embodiment of the miniaturized VCM with air guide and air bellows.
Figure 3:
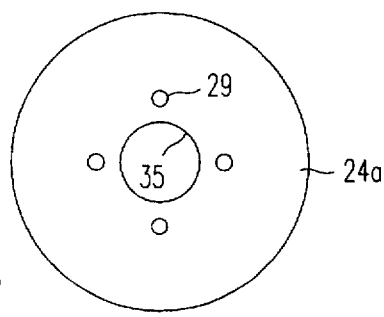
FIG. 3 is bottom view thereof.
Figure 4A:
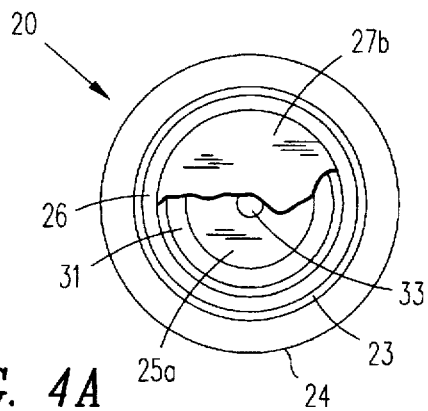
FIG. 4A is a broken-away top view of the VCM taken on the line 4A—4A of FIG. 2.

FIGS. 2 and 4A illustrate a preferred cylindrical embodiment of a VCM 20 that incorporates the various novel features of this invention. A magnet assembly 21 includes a cylindrical permanent magnet 23 such as a rare earth e.g. NdFeB and ferromagnetic components namely, a steel flux return cylinder 24 with a circular iron connection plate 24a, and a soft iron, ferromagnetic cylindrical central core 25. The coil assembly comprises a tubular coil 26 and a tubular coil holder 27, the latter which forms an air bellows with the distal end of core 25. A first feature of this invention is the incorporation of an air guide for the coil holder as the coil holder moves the payload. Assuming that the magnet assembly 21 remains stationary, a surface 28 of the ferromagnetic core 25 serves as an air bearing track for the coil holder 27. The ferromagnetic core 25 includes air ducts 29, parallel to the vertical longitudinal axis 22 of the air bellows in the form of internal passageways (four shown in FIG. 5) that transport air to and through transverse air guide orifices 29a and 29b to an air guide surface 30 on the bellows 27 facing the surface 28 of ferromagnetic core 25. An air gap 31 is formed between surfaces 28 and 30. As the electric current in the coil interacts with the permanent magnetic field to generate a force that propels the coil, the coil holder 27 and rides on a cushion of compressed air in air gap 31.

Figure 5:
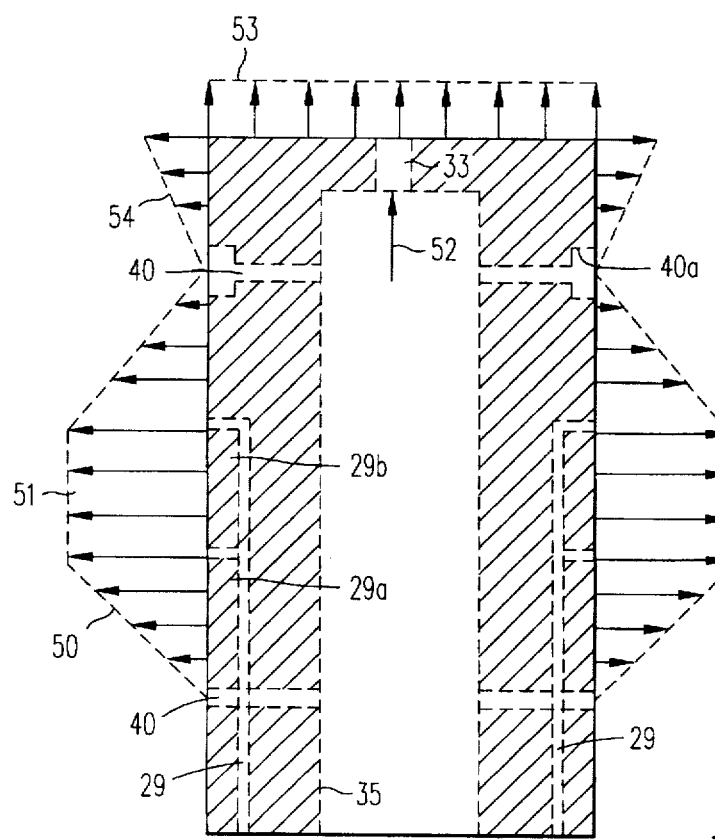
FIG. 5 is a schematic cross-sectional view of the iron core showing the air passages and the pressure profile provided by the compressed air between the ferromagnetic core and the coil holder.

In one embodiment eight vents 40, four shown in FIG. 5, are provided offset from the orifices at each end of air bore 35 and each 90° apart from the next adjacent vent. An air distribution disc (not shown) may be inserted between plate 24a and the core inner end to distribute air to the passageways from a common passageway in plate 24a. A pressure of about 60 psi is provided from a source (not shown) in flow connection with ducts 29 and orifices 29a and 29b. The orifice holes generally four, six, or eight in number are spaced equally around the cylindrical periphery of the core and are spaced longitudinally of the core. The orifices have a diameter of about 10 microns. The diameters of the orifices may differ to obtain a desired pressure distribution profile, dependent on the payload weight distribution and the width of air gap 31. The vent holes 40 (FIG. 5) have a diameter of about 2 mm. The above pressure and orifice sizes preferably are used with an air gap 31 of from about 5 to about 7.5 microns. Greater air gaps can be utilized when the pressure in orifices 29a and 29b are higher. Lesser air gaps can be utilized when the pressure is lower. Pressures of about from 40 to about 60 psi are usable to supply air to the air bearing between the coil holder and the core.

Figure 4B:
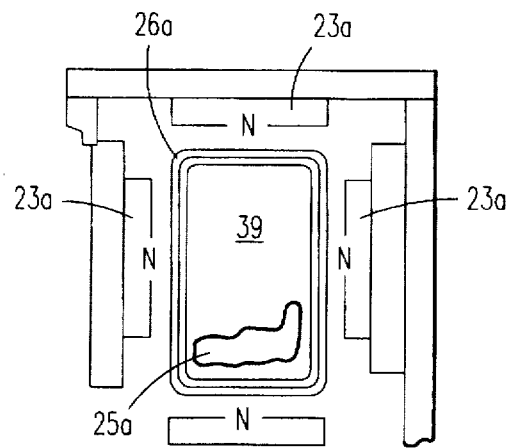
FIG. 4B is a broken-away top view of a rectangular second embodiment of the invention.

A second embodiment of the invention is illustrated in FIG. 4B where the coil is a rectangular coil 26a and the magnet is a pair or a double-pair of flat magnets 23a spacedly positioned from the flat sides of the coil and its rectangular holder 39. The core 25 will likewise be a rectangular core 25a and the flux return structure and the connection plate is rectangular.

As seen in FIG. 5 the vents are spaced inbound and outbound of the orifices 29a and 29b so that the air pressure distribution has a cross-section profile extending between the vents 40 of a truncated triangular shaped toroid 50 with the truncated portion 51 extending equally above the lower vent and below the upper vent. The pressure profile 53 in the bellows chamber 32 is flat (equal) as the pressure (arrow 52 to and through bore 33) acts on holder surface 27a (FIG. 2). Pressure profile portion 54 is conical and goes to ambient pressure at the vent 40 from the air pressure at profile 53. A circumferential groove 40a in the core connects all the vents.

The air guide improves the performance of the VCM by reducing friction and providing more even acceleration. Thus, the VCM of the invention is ideally suited for applications in which positions, velocities and accelerations must be carefully controlled and/or vibrations must be suppressed. In certain applications, an approximate 5 cm. length of movement of the coil holder is provided. In addition, the built-in air guide eliminates the need for an external guide for the payload and renders the VCM more adaptable to applications where an external guide for the payload is difficult or impossible.

The air pressure within a chamber 32 between an outer end 25a of the iron core 25 and the closed end 27a of the bellows or coil holder 27 is typically at one atmosphere when the air bellows is in a horizontal mode of operation. A central bore 34 is provided axially in the iron core 25 and a connecting through-hole 35 provided in connection plate 24a. A restrictor 36 with an orifice may be inserted within an end bore 33 in the end of 25a of the iron core. The bore 33 is smaller than bores 34 and 35 so as to connect an adjustable regulator 38, such as an SMC pressure regulator series AR 425, which is connected to bore 35 by an air hose 37. The vent 40 and groove 40a extend to the atmosphere.

The second significant feature of this invention is the air bellows including a bellows chamber 32 located at the distal end 25a of the ferromagnetic core enveloped by an enclosed end and a top portion of the coil holder 27. In a vertical mode of operation, i.e. the coil holder/core are vertically oriented with the connection plate 24 at the bottom and the end wall 27a of the holder supporting a payload, such as a motion stage or other structure, compressed air is fed into air duct 34 inside the ferromagnetic core or to the bellows chamber by hose 37. In some applications, the VCM must sustain a nontrivial payload or counter-force on the payload. An example is where the payload exerts a vertical gravitational force on the VCM. To sustain such a payload, the VCM must have a sufficiently large magnet-coil assembly and a strong electric current. Not only may the size requirement of the VCM be infeasible, but the greater amount of heat generated by the strong electric current may also have undesirable thermal effects. The air bellows of the present invention solves this problem by using compressed air to sustain or balance the payload. The electromagnetic force makes relatively minor adjustments to the positioning of the payload. Consequently, the VCM can remain small even for a payload with large weight or counter-force. The VCM can function more efficiently without generating large amount of heat. Furthermore, the air flux inside the VCM also serves as a cooling means to reduce the thermal effects of the electric current.

The air pressure for the air guide and that for the air bellows will not interfere with one another since vents are provided for air exit as shown in FIG. 5. Air enters the air guide surface through different air ducts than the air duct for the air bellows. Air exits through vents placed strategically to allow the air guide and air bellows to function without interfering with one another are illustrated in the pressure profile in FIG. 5. The air guide can operate smoothly with steady pressure between the guide surfaces. The air bellows can sustain various payload levels by providing the appropriate pressure such as in the range of about 15 psi to about 100 psi dependent on the load to be supported.

The unique and key feature of this invention is that an efficient, air guided, miniaturized VCM design is possible through the use of compressed air to provide an essentially frictionless built-in air guide for the VCM payload and to pressurize an air bellows to support the payload.

Figure 6:
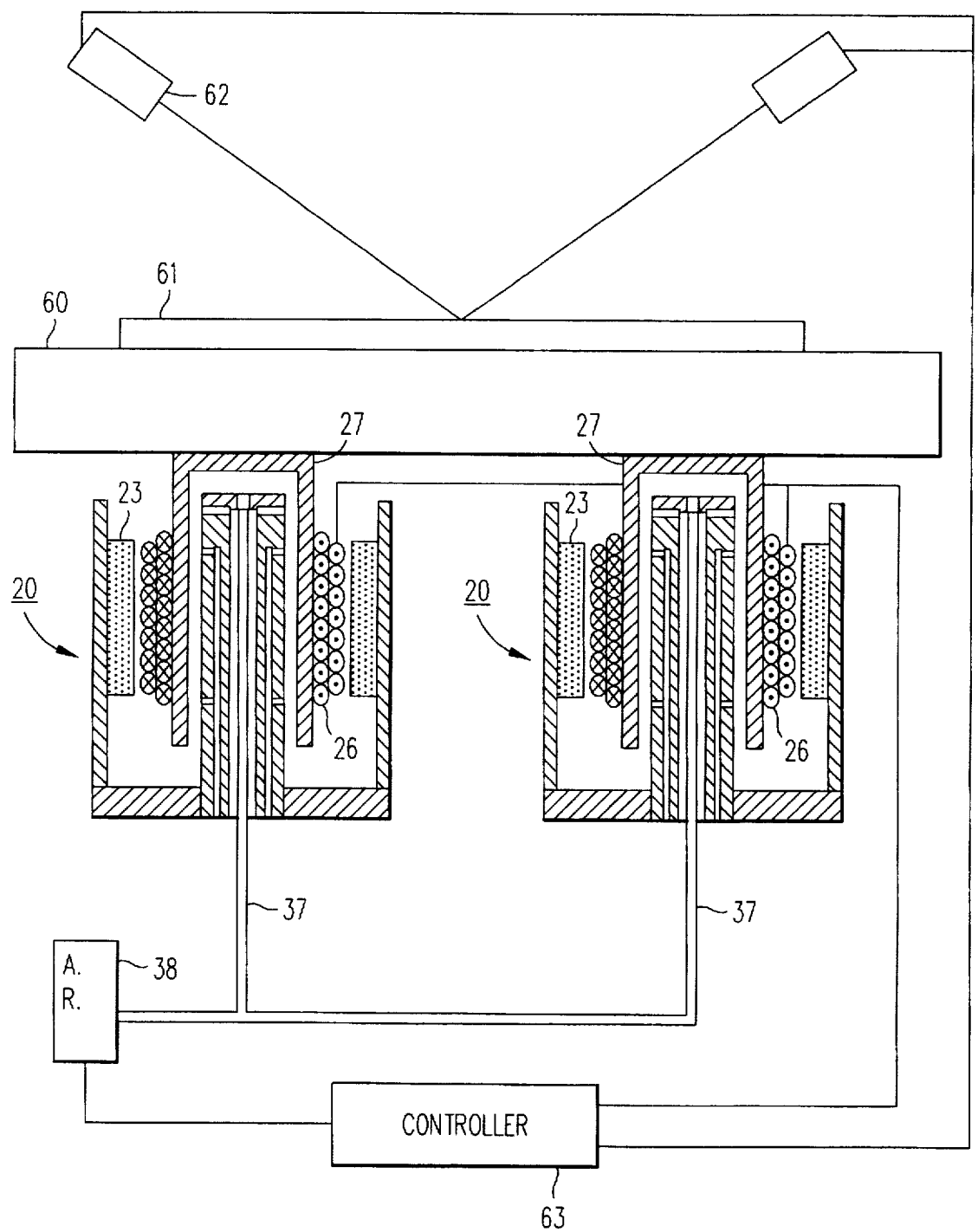
FIG. 6 is schematic side view partially in section of an exposure apparatus showing a pair of voice coil motors and an arm regulator.

The embodiment of applying VCM 20 to the table of the exposure apparatus is shown in FIG. 6. Coil holders 27 of VCMs 20 are connected under a table 60. Wafer 61 for a semiconductor is located on the table 60. The height position of the Z direction of wafer 61 is measured by auto-focus sensors 62. Results of the measurement by auto-focus sensors 62 are sent to controller 63. Controller 63 sends the control signals to adjustable regulator 38 and the current signals to the coil 26 of VCMs 20 in accordance with the results of the auto-focus sensors 62. In this embodiment, the weight of table 60 and wafer 61 is supported by the air bellows. And, a slight position of Z direction is adjusted with coil 26.

The above description of embodiments of this invention is intended to be illustrative and not limiting. Other embodiments of this invention will be obvious to those skilled in the art in view of the above disclosure.

I claim:
1. A voice coil motor comprising:
   a magnet assembly including a housing providing a flux return path and a ferromagnetic core and at least one magnet attached to said housing and spaced from said core;
   a movable coil assembly including a coil holder having an open end, a side and closed end and an electrical wire coil on a surface of said side, said coil holder being telescoped with respect to said core with an air gap between said side and said core and with a chamber between said closed end and said core, said coil being spaced from said at least one magnet;
   a first pressurized air supply for supplying air to the air gap such that pressurized air is introduced into said air gap to provide an air bearing; and
   a second pressurized air supply extending to said chamber to support said coil holder with respect to a distal end of said core.

2. The voice coil motor of claim 1 wherein said chamber is formed between the distal end of said core and the closed end of said coil holder, said chamber and said core being oriented vertically such that said chamber and said closed end provides an air bellows to provide a counter-balance to a load on said coil holder.

3. A voice coil motor comprising:
   a magnet assembly including a housing providing a flux return path and a ferromagnetic core and at least one magnet attached to said housing and spaced from said core;
   a movable coil assembly including a coil holder for supporting a payload and an electrical wire coil on a surface of said coil holder, said coil holder being telescoped with respect to said core with a working air gap therebetween and said coil being spaced from said at least one magnet;
   wherein said coil holder has an open end spaced from and slidable longitudinally with respect to said core to form the air gap with said core and a closed end forming an air bellows including a bellows chamber with said core;
   a first pressurized air supply for supplying air to the air gap such that pressurized air is introduced into said air gap to provide an air bearing;
   a second pressurized air supply extending to said chamber to support said coil holder with respect to a distal end of said core; and
   wherein said first pressurized air supply is connected to a series of longitudinal passageways in said core and a series of air orifices in flow communication with said passageways.

4. The voice coil motor of claim 3 wherein said orifices extend transverse to said passageways and said orifices are spaced at 90° locations around said core, said core being cylindrical, and wherein said orifices are spaced at longitudinal positions along an outer periphery of said core.

5. The voice coil motor of claim 4 further including a series of air vents in said core inboard and outboard of said orifices to provide a predetermined air distribution profile in said air gap.

6. The voice coil motor of claim 1 wherein said core includes an end bore for supplying air from said second pressurized air supply to said chamber.

7. The voice coil motor of claim 6 further including a hose which is connected to said end bore for supplying air to said chamber.

8. The voice coil motor of claim 1 wherein said core, said coil holder and said at least one magnet are all of a cylindrical shape.

9. The voice coil motor of claim 1 wherein said coil holder and said coil are rectangular and wherein said at least one magnet is at least one pair of flat rectangular magnets spacedly positioned parallel to at least two opposite flat sides of said coil.

10. The voice coil motor of claim 1 wherein said core distal end includes an end bore and said second pressurized air supply is connected to a pressure regulator and an air hose is connected to said regulator and to said end bore and to said chamber.

11. The voice coil motor of claim 6 further including a coil connection plate forming part of said housing;
- a second bore extending from an end of said core adjacent to said connection plate, said end bore being smaller than said second bore;
- a hose connected to said end bore and extending through said second bore, for supplying air to said chamber; and
- a series of spaced air vents extending from a peripheral surface of said core, said vents being spaced along said core such that an air pressure distribution is formed in said air gap.

12. A voice coil motor comprising:
- a magnet assembly including a housing providing a flux return path and a ferromagnetic core and at least one magnet attached to said housing and spaced from said core;
- a movable coil assembly including a coil holder for supporting a payload and an electrical wire coil on a surface of said coil holder, said coil holder being telescoped with respect to said core with a working air gap therebetween and said coil being spaced from said at least one magnet;
- wherein said coil holder has an open end spaced from and slidable longitudinally with respect to said core to form the air gap with said core and a closed end forming an air bellows including a bellows chamber with said core;
- a first pressurized air supply for supplying air to the air gap such that pressurized air is introduced into said air gap to provide an air bearing;
- a second pressurized air supply extending to said chamber to support said coil holder with respect to a distal end of said core; and
- further including a series of spaced air vents extending through said core from said air gap to a position in a bore within said core, said vents being spaced along said core such that a annular air pressure distribution is formed in said air gap, a cross-section profile of said air pressure distribution being of a truncated triangular shape extending between said vents.

* * * * *